United States Patent Office 3,810,833
Patented May 14, 1974

3,810,833
PURIFICATION PROCESSES
Thomas Nicklin, Rochdale, England, assignor to North Western Gas Board, Altrincham, Cheshire, England
No Drawing. Filed Aug. 24, 1972, Ser. No. 283,469
Claims priority, application Great Britain, Sept. 2, 1971, 40,875/71
Int. Cl. C02b 1/46, 1/60
U.S. Cl. 210—32                    13 Claims

ABSTRACT OF THE DISCLOSURE

An effluent purification process for removing vanadium salts, sodium anthraquinone disulphonates and di-hydroxy-anthraquinones from effluent liquors which have been used in processes for removing hydrogen sulphide from fuel gases or liquid hydrocarbons comprises the slips of passing the liquor through an adsorbent bed to remove the anthraquinone compounds and through an ion exchange material to remove the vanadium compounds.

---

This invention relates to purification processes and, more particularly, to a process for removing vanadium salts, sodium anthraquinone disulphonate and dihydroxy anthraquinone from autoclave effluent liquor derived from the so-called "Stretford" liquid purification process.

The Stretford liquid purification process for removal of hydrogen sulphide from fuel gases produces, as an oxidation product of the hydrogen sulphide, a solid sulphur product which is usually removed from the plant circulating liquor by filtration. The sulphur cake produced may or may not be water washed on the filter and is then melted in an autoclave to give pure molten sulphur and a separate aqueous layer containing the Stretford Process reagents, principally sodium vanadate and sodium-2:7-anthraquinone disulphonate, together with 2:7-dihydroxy-anthraquinone the latter being produced by desulphonation of the sodium-2:7-anthraquinone disulphonate under the operating conditions of the autoclave. The molten sulphur is run off, allowed to solidify and is then stored as a saleable by-product of the gas purification process. The aqueous solution of Stretford Process reagents is a waste product and is customarily run to drain. The possibility exists, however, that anti-pollution legislation may well lead to the prohibition of discharging liquors containing vanadium and anthraquinone compounds to the public sewer.

It is an object of the present invention to provide a process for purifying the autoclave effluent liquor to remove anthraquinone compounds and vanadium compounds.

According to the present invention, there is provided a process for removing anthraquinone compounds and vanadium compounds from a liquor containing such compounds, comprising the steps of passing the liquor through an adsorbent bed to remove the anthraquinone compounds and through an ion exchange material to remove the vanadium compounds.

The above steps may be carried out in any order or simultaneously but, preferably, the anthraquinone compounds are removed first so that the active sites on the ion exchange material are not blocked by anthraquinone compounds thereby preventing removal of the vanadium compounds from the liquor.

The pH of the solution is below 7 and, most advantageously, between 2.5 and 3.0. At this pH, an anion exchange material is employed, though a cation exchange material can be used if the pH of the liquor is sufficiently low i.e. about 1 or less, for the vanadium to be present in the cation species.

The adsorbent material is activated carbon.

An anion exchange resin of the modified polystyrene type has been found to be suitable as the ion exchange material.

Also according to the present invention there is provided, in the Stretford process as defined herein, the steps of passing the autoclave effluent liquor through an adsorbent bed to remove the anthraquinone compounds and through an ion exchange material to remove the vanadium compounds.

Experimentally, it has been found that a bed of active carbon will quantitatively remove and separate the anthraquinone compounds from the liquor, presumably by a process of physical adsorption on the extended area of the carbon structure.

Both materials used in the purification process may be regenerated, on exhaustion, to allow their re-use. This is achieved, in the case of the active carbon bed, by washing the bed with hot water or dilute sodium hydroxide or an alkaline solution of sodium dithionite. This process removes the adsorbed anthraquinone compounds from the carbon; and achieves separation of the 2:7 and 2:6 anthraquinone disulphonic acids from 2:7 and 2:6 dihydroxy anthraquinone; the latter are not desirable constituents of Stretford liquor and may be rejected. The solution of 2:7 and 2:6 anthraquinone disulphonate so obtained may be returned to the main body of circulating liquor. Regeneration of the ion-exchange resin bed is accomplished simply by passing sodium hydroxide solution through the bed. This process, in effect, replaces the loosely retained vanadate ion by hydroxyl ions derived from the sodium hydroxide solution; the vanadium is eluted from the bed as sodium vanadate and may be returned to the main circulating liquors.

Thus the combined process achieves removal, in a re-useable form, of the anthraquinone acids and vanadium content of the autoclave liquor; the effluent from the combined process is substantially pure water containing innocuous ions, from the pollution viewpoint, such as sodium, sulphate and carbonate.

The invention is illustrated by the following example.

A synthetic liquor, simulating a typical acidified autoclave purge liquor, was made up to the following composition:

| | |
|---|---|
| Vanadium as acidified sodium meta-vanadate | M/200. |
| Sodium potassium tartrate | M/600. |
| Sodium 2:7-anthraquinone disulphonate | M/1000. |
| Iron sequestered with E.D.T.A. | 16 p.p.m./w./v. |
| pH | 2.5–3.0. |
| 2:7-dihydroxyanthraquinone | M/2000. |

This liquor was passed through a bed of a proprietary active carbon material produced by Sutcliffe Speakman Ltd. and sold as Quality No. 207, Type B, 8–12 B.S. mesh, at a liquid space velocity of 100 hr.$^{-1}$. During a test period of two hours no anthraquinone compounds could be detected in the liquid effluent from the bed. This effluent was then passed through a bed of proprietary anion ion exchange resin (Permutit DE-Acidite NIP Strong base, modified polystyrene) at a liquid space velocity of 24 hr.$^{-1}$. In a test period of 2½ hours the vanadium content of the exit liquor did not exceed 10 p.p.m.

Both the anthraquinone compounds and the vanadium compounds adsorbed and ion-exchanged respectively were recoverable quantitatively from the active carbon and ion-exchange resin beds by eluting the beds. For example, the ion-exchange resin bed was eluted with 10% w./v. NaOH in a sufficient quantity to give a M/25 vanadium ion solution. The anthraquinone compounds adsorbed onto the active carbon bed were recovered by eluting the bed with an aqueous alkaline solution of sodium dithionite having the composition:

| | Percent, w.v. |
|---|---|
| Sodium dithionite | 10 |
| Sodium hydroxide | 10 |

This gave a solution which was M/10 with respect to 2:7-anthraquinone disulphonic acid, representing a concentration of the purge liquor by a factor of 100.

What is claimed is:

1. A process for the removal of dissolved vanadium anionic species and an anthraquinone disulphonate from the effluent liquor obtained from the autoclave treatment of a sulphur cake produced in a process for removing hydrogen sulphide from fuel gases or liquid hydrocarbons by means of a wash liquor containing said vanadium species and said anthraquinone disulphonate which comprises the steps of:

passing the liquor having a pH of between 1 and 7 through a bed of activated carbon to thereby adsorb substantially all of said anthraquinone disulphonates thereon;

passing the liquor through a bed of solid anion exchange resin to remove said vanadium compounds from the liquor.

2. The process as claimed in claim 1 wherein the liquor is passed through the bed of activated carbon and then passed through the bed of solid anion exchange resin.

3. The process as claimed in claim 1 wherein the liquor is passed through the bed of solid anion exchange resin and then passed through the bed of activated carbon.

4. The process as claimed in claim 1 in which the anion exchange resin is of the modified polystyrene type.

5. The process as claimed in claim 1 in which the anion exchange resin is regenerated by passing a sodium hydroxide solution therethrough.

6. The process as claimed in claim 1 in which the activated carbon bed is regenerated by washing with hot water, a sodium hydroxide solution or an alkaline solution of sodium dithionite.

7. The process as claimed in claim 6 in which the washing is with an alkaline solution of sodium dithionite.

8. The process as claimed in claim 1 in which the liquor has a pH of between 2.5 and 3.0.

9. A process for the removal of dissolved vanadium cationic species and an anthraquinone disulphonate from the effluent liquor obtained from the autoclave treatment of a sulphur cake produced in a process for removing hydrogen sulphide from fuel gases or liquid hydrocarbons by means of a wash liquor containing said vanadium species and said anthraquinone disulphonate which comprises the steps of:

passing the liquor having a pH of less than 1 through a bed of activated carbon to thereby adsorb substantially all of said anthraquinone disulphonates thereon;

passing the liquor through a bed of solid cation exchange resin to remove said vanadium compounds from the liquor.

10. The process as claimed in claim 9 wherein the liquor is passed through the bed of activated carbon and then passed through the bed of solid cation exchange resin.

11. The process as claimed in claim 9 wherein the liquor is passed through the bed of solid cation exchange resin and then passed through the bed of activated carbon.

12. The process as claimed in claim 9 in which the activated carbon bed is regenerated by washing with hot water, a sodium hydroxide solution or an alkaline solution of sodium dithionite.

13. The process as claimed in claim 12 in which the washing is with an alkaline solution of sodium dithionite.

References Cited

UNITED STATES PATENTS

| 3,436,344 | 4/1969 | Canning et al. | 210—39 |
| 3,332,737 | 7/1967 | Krans | 210—24 X |
| 2,788,331 | 4/1957 | Greer et al. | 210—37 X |
| 2,669,713 | 2/1954 | Osman | 210—30 |
| 3,720,626 | 3/1973 | Benzaria et al. | 210—30 X |
| 3,568,405 | 3/1971 | Perry | 55—73 X |

FOREIGN PATENTS

| 254,450 | 5/1963 | Australia. |

SAMIH N. ZAHARNA, Primary Examiner

T. G. WYSE, Assistant Examiner

U.S. Cl. X.R.

210—37, 38, 40